United States Patent [19]

Oishi et al.

[11] Patent Number: 4,667,636
[45] Date of Patent: May 26, 1987

[54] FUEL INJECTION TYPE INTERNAL COMBUSTION ENGINE

[75] Inventors: Kiyohiko Oishi; Kiyoshi Nakanishi, both of Susono; Nobuaki Kayanuma, Gotenba; Taiyo Kawai, Susono; Norihisa Nakagawa, Susono; Hiroshi Nomura, Susono, all of Japan

[73] Assignee: Toyota Jidosha Kabushiki Kaisha, Aichi, Japan

[21] Appl. No.: 840,755

[22] Filed: Mar. 18, 1986

[30] Foreign Application Priority Data

Mar. 22, 1985 [JP] Japan ................................. 60-56126
May 15, 1985 [JP] Japan ................................. 60-101504
May 15, 1985 [JP] Japan ............................. 60-70683[U]

[51] Int. Cl.⁴ ........................................... F02B 15/00
[52] U.S. Cl. .................................. 123/432; 123/308; 123/90.16
[58] Field of Search ................... 123/432, 308, 90.16, 123/52 M, 188 M

[56] References Cited

U.S. PATENT DOCUMENTS

| | | | |
|---|---|---|---|
| 4,256,068 | 3/1981 | Irimajiri et al. | 123/432 |
| 4,285,310 | 8/1981 | Takizawa et al. | 123/432 |
| 4,350,126 | 9/1982 | Honda | 123/432 |
| 4,570,590 | 2/1986 | Kawai et al. | 123/432 |

FOREIGN PATENT DOCUMENTS 56-148636 11/1981 Japan .

Primary Examiner—E. Rollins Cross
Attorney, Agent, or Firm—Parkhurst & Oliff

[57] ABSTRACT

An internal combustion engine comprising three intake valves. The first intake valve and the second intake valve open at a crank angle near to the top dead center of the intake stroke. The third intake valve opens approximately at the center of the intake stroke. An air control valve is arranged in the second intake passage connected to the combustion chamber via the second intake valve. The air control valve is closed when the engine is operating under a partial load. A fuel injector is arranged in the third intake passage connected to the combustion chamber via the third intake valve. The injecting operation of the fuel injector is stopped during the intake stroke.

24 Claims, 14 Drawing Figures

FUEL INJECTION TYPE INTERNAL COMBUSTION ENGINE

BACKGROUND OF THE INVENTION

1. Field of the Invention

The present invention relates to a fuel injection type internal combustion engine equipped with a plurality of intake valves.

2. Description of the Related Art

The fuel consumption of an engine is reduced as the air-fuel mixture fed into the engine cylinders becomes lean. Consequently, in order to reduce the fuel consumption, it is preferable to make the air-fuel mixture as lean as possible. However, where a lean air-fuel mixture is used, a problem occurs in that good ignition cannot be obtained. In addition, even if the lean air-fuel mixture is ignited, since the operating velocity of the flame is low, another problem occurs in that a good combustion cannot be obtained.

In order to eliminate such problems, an engine is known in which the intake passage extends tangentially to the inner circumferential wall of the combustion chamber. A fuel injector is arranged in the intake passage, and the fuel injection from the fuel injector is stopped at a time slightly before the intake valve closes (Japanese Unexamined Patent Publication No. 56(1981)-148636).

In this engine, when the engine is operating under a partial load, only air is fed into the combustion chamber of the engine at the former half of the intake stroke, fuel injected from the fuel injector is fed into the combustion chamber at the latter half of the intake stroke. Consequently, the layer of rich air-fuel mixture is formed in the uppermost interior of the combustion chamber, and the layer of lean air-fuel mixture is formed in the lower interior of the combustion chamber. Thus, the air-fuel mixture in the combustion is stratified. As a result, since the rich air-fuel mixture is collected around the spark plug, the air-fuel mixture can be easily ignited. In addition, since a swirl motion is created in the combustion chamber by an air stream flowing into the combustion chamber from the intake passage, the flame of the air-fuel mixture ignited by the spark plug can be rapidly propagated.

In an engine in which the air-fuel mixture in the combustion chamber is stratified, where the mean value of the air-fuel ratio of the entire air-fuel mixtures stratified in the combustion chamber is maintained as a constant, the higher the degree of stratification, the better the combustion. For example, where the mean value of the air-fuel ratio of the air-fuel mixtures overall is 25:1, a good combustion can be obtained when the air-fuel ratio of the rich air-fuel mixture is 15:1 and the air-fuel ratio of the lean air-fuel mixture is 35:1, as compared with the case where the air-fuel ratio of the rich air-fuel mixture is 20:1 and the air-fuel ratio of the lean air-fuel mixture is 30:1. That is, it is possible to ignite the rich air-fuel mixture even if the air-fuel ratio thereof is 20:1. However, in this case, the flame of the burning rich air-fuel mixture is weak, and thus, since it takes a long time to burn the lean air-fuel mixture, it is difficult to obtain a good combustion. Contrary to this, where the air-fuel ratio of the rich air-fuel mixture is 15:1, the flame of the burning rich air-fuel mixture becomes strong. Consequently, in this case, even if the lean air-fuel mixture is much leaner, the time period necessary to burn the lean air-fuel mixture becomes short, and thus it is possible to obtain a good combustion. Therefore, as mentioned above, in order to obtain a good combustion, it is necessary to enhance the degree of stratification.

However, in the above-mentioned engine disclosed in Japanese Unexamined patent publication No. 56-148636, since the fuel injected from the fuel injector flows into the combustion chamber at a high speed together with air, the fuel is easily spread widely in the combustion chamber. Therefore, in this engine, in spite of the stratification of the air-fuel mixture in the combustion chamber, a problem occurs in that the degree of stratification is not sufficiently enhanced.

In order to eliminate such a problem, the present applicant has already proposed an engine equipped with two intake valves (Japanese patent application No. 59(1984)-69176). In this engine, the first intake passage connected to the combustion chamber via the first intake valve is formed in a helical shape, and an air control valve, which is open when the engine is operating under a heavy load, is arranged in the second intake passage connected to the combustion chamber via the second intake valve. The fuel injector is arranged in the second intake passage downstream of the air control valve.

In addition, the present applicant has also proposed an engine equipped with a third intake valve in order to improve the volumetric efficiency when the engine is operating under a heavy load (Japanese patent application No. 59(1984)-103124).

In these engines proposed by the present applicant, when the engine is operating under a partial load, the air control valve arranged in the second intake passage is closed. Consequently, when the second intake valve opens, the level of vacuum in the second intake passage downstream of the air control valve immediately increases to a level near the level of vacuum in the combustion chamber. As a result, since the pressure difference between vacuum in the combustion chamber and vacuum in the second intake passage downstream of the air control valve is small, fuel injected into the second intake passage downstream of the air control valve flows into the combustion chamber at a very low speed. Consequently, in these engines, the fuel is less easily spread in the combustion chamber, and thus it is possible to enhance the degree of stratification.

However, in these engines, if the operating time of the second intake valve is set so that the second intake valve is open at the latter half of the intake stroke, in order to enhance the degree of stratification, since the flowing speed of the fuel into the combustion chamber from the second intake passage is very low, the entire amount of fuel injected into the second intake passage cannot be fed into the combustion chamber, and the fuel which has not been fed into the combustion chamber is fed into the combustion chamber as soon as the second intake valve opens in the next intake stroke. However, as mentioned above, if the fuel remaining in the second intake passage is fed into the combustion chamber when the opening operation of the second intake valve is started, the fuel is positioned at the central portion of the combustion chamber. This results in a problem in that a good stratification of the air-fuel mixture in the combustion chamber cannot be obtained.

Contrary to this, if the opening time of the second intake valve is advanced, in order to feed the entire amount of fuel in the second intake passage into the combustion chamber, the fuel in the second intake passage is fed into the combustion chamber from the early part of the intake stroke, and thus it is difficult to obtain a good stratification of the air-fuel mixture in the combustion chamber. That is, where the engine is constructed so as to stratify the air-fuel mixture in the combustion chamber by closing the air control valve arranged in the second intake passage, it is impossible to obtain a good stratification independently of the opening time of the second intake valve.

SUMMARY OF THE INVENTION

An object of the present invention is to provide a fuel injection type engine capable of enhancing the degree of stratification in the combustion chamber.

According to the present invention, there is provided an internal combustion engine having a combustion chamber, comprising: a first intake valve opening at a crank angle near the top dead center of the intake stroke and closing at the beginning of the compression stroke; a second intake valve opening at a crank angle near the top dead center of the intake stroke and closing at the beginning of the compression stroke; a third intake valve opening approximately at the center of the intake stroke and closing at the beginning of the compression stroke; a first intake passage connected to the combustion chamber via the first intake valve and creating a swirl motion in the combustion chamber; a second intake passage connected to the combustion chamber via the second intake valve; a third intake passage connected to the combustion chamber via the third intake valve; an air control valve arranged in the second intake passage; means for actuating the air control valve in response to an engine load to open the air control valve when the engine load exceeds a predetermined load; a fuel injector arranged in the third intake passage; and electronic control means controlling the injecting operation of the fuel injector to stop the injecting operation during the intake stroke.

The present invention may be more fully understood from the description of preferred embodiments of the invention set forth below, together with the accompanying drawings.

DESCRIPTION OF PREFERRED EMBODIMENTS

Figure 1:
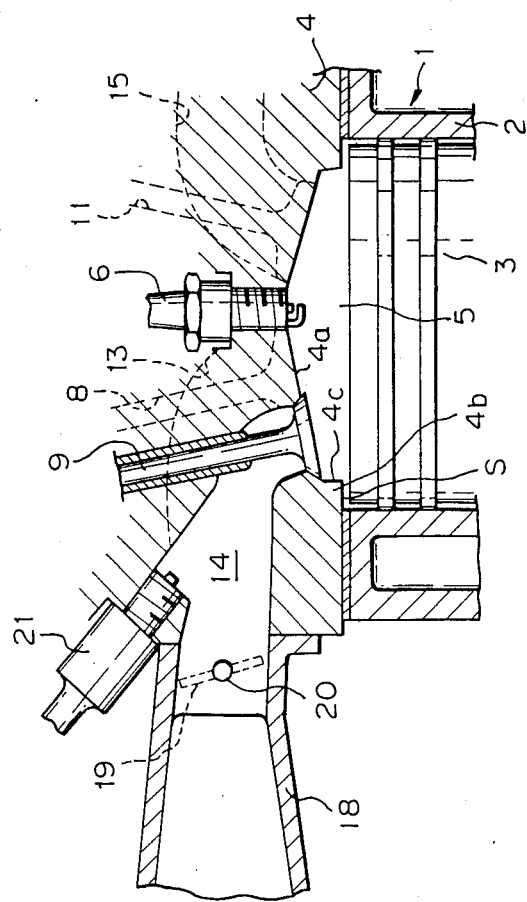
FIG. 1 is a cross-sectional side view of an engine according to the present invention.

Referring to FIGS. 1 through 5, reference numeral 1 designates an engine body, 2 a cylinder block, 3 a piston reciprocally movable in the cylinder block 2, and 4 a cylinder head fixed to the cylinder block 2; 5 a combustion chamber formed between the piston 3 and the cylinder head 4, and 6 a spark plug arranged approximately at the center of the top of the combustion chamber 5. Three intake valves, consisting of a first intake valve 7, a second intake valve 8, and a third intake valve 9 are arranged on the inner wall of the cylinder head 4, and two exhaust valves, consisting of a first exhaust valve 10 and a second exhaust valve 11, are also arranged on the inner wall of the cylinder head 4. The first intake valve 7 has a valve head having a diameter approximately the same as that of the valve head of the second intake valve 8, and the third intake valve 9 has a valve head having a diameter smaller than those of the valve head of the first intake valve 7 and the second intake valve 8. The third intake valve 9 is arranged between the first intake valve 7 and the second intake valve 8 at a position opposite to the center of the combustion chamber 5 with respect to a line passing through the centers of the first intake valve 7 and the second intake valve 8. A downwardly projecting raised wall 4b is formed on the periphery of the inner wall 4a of the cylinder head 4, which periphery is located on the third intake valve side. A squish area S is formed between the flat bottom face of the raised wall 4b and the flat periphery of the top face of the piston 3. The raised wall 4b has a vertical side face 4c extending archwise along the peripheral edge of the third intake valve 9, and the peripheral edge of the third intake valve 9, which is located opposite to the center of the combustion chamber 5, is surrounded by the vertical side face 4c of the raised wall 4b. The vertical side face 4c is connected, on one hand, to a vertical side face 4d of the raised wall 4b, which extends along the peripheral edge of the first intake valve 7, and on the other hand, to a vertical side face 4e of the raised wall 4b, which extends along the peripheral edge of the second intake valve 8.

Figure 3:
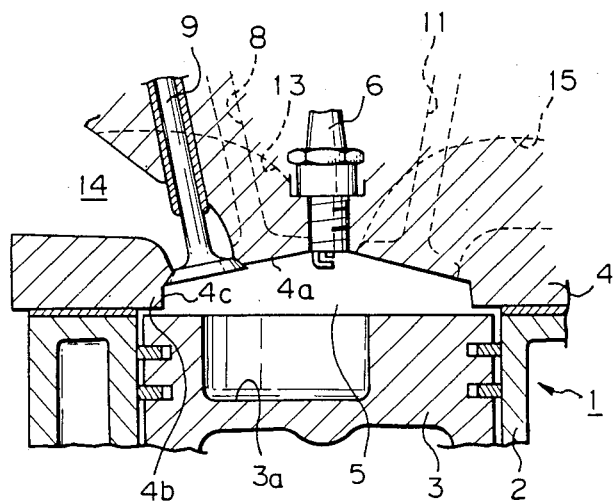
FIG. 3 is a cross-sectional side view of the engine illustrated in FIG. 1, particularly illustrating the cross-sectional shape of the piston.
Figure 4:
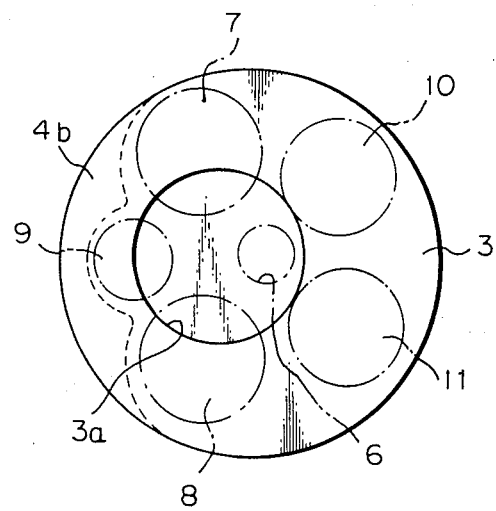
FIG. 4 is a plan view of the piston.

As illustrated in FIGS. 3 and 4, a cylindrical cavity 3a is formed on the top face of the piston 3. This cavity 3a is arranged eccentrically to the central axis of the piston 3 so that, as shown in a plan view illustrated in FIG. 4, the peripheral edge of the cavity 3a passes through the third intake valve 9, and that the spark plug 6 is located in the peripheral area of the cavity 3a.

Figure 2:
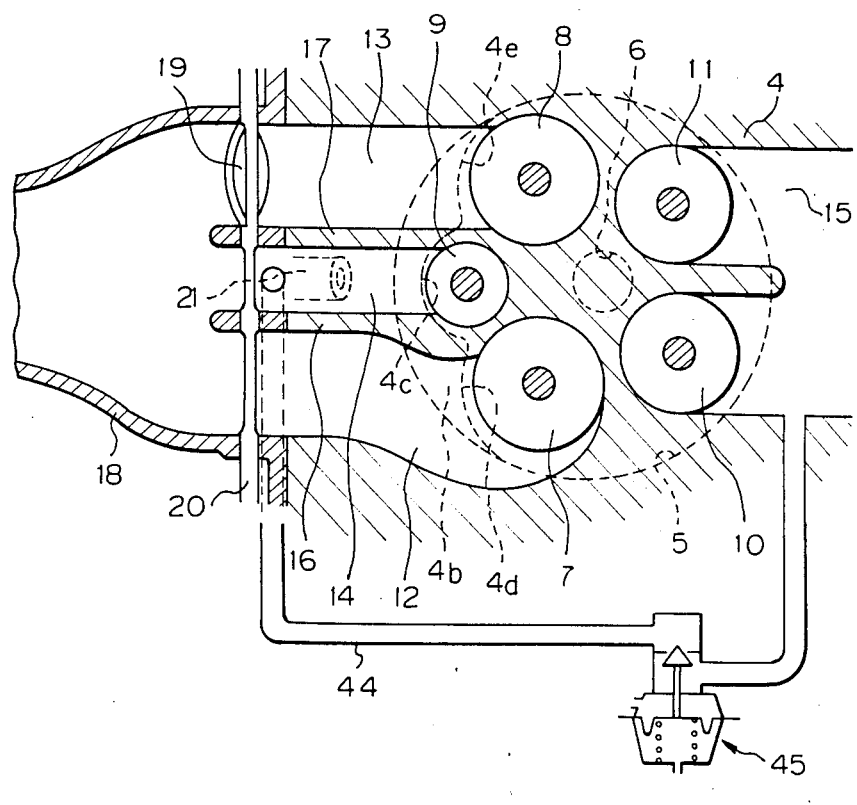
FIG. 2 is a cross-sectional plan view of the engine illustrated in FIG. 1.

Turning to FIGS. 1 and 2, three intake passages, consisting of a first intake passage 12, a second intake passage 13 and a third intake passage 14, are formed in the cylinder head 4, and an exhaust passage 15 which is connected to the combustion chamber 5 via the exhaust valves 10, 11, is also formed in the cylinder head 4. The first intake passage 12 is separated from the third intake passage 14 by a thin separating wall 16, and the second intake passage 13 is separated from the third intake passage 14 by a thin separating wall 17. These intake passages 12, 13, and 14 extend in parallel to each other. The third intake passage 14 is located between the first intake passage 12 and the second intake passage 13, and the third intake passage 14 has a cross-sectional area smaller than those of the first intake passage 12 and the second intake passage 13. The first intake passage 12, the second intake passage 13, and the third intake passage 14 are connected to the same manifold branch 18 and join each other in the interior of the manifold branch 18.

The first intake passage 12 is connected to the combustion chamber 5 via the first intake valve 7. This first intake passage 12 is shaped in the form of a helical port in order to create a swirl motion in the combustion chamber 5. The second intake passage 13 is connected to the combustion chamber 5 via the second intake valve 8. This second intake passage 13 is shaped in the form of a straight port extending in a straight line. An air control valve 19 is arranged in the inlet portion of the second intake passage 13, and the valve shaft 20 of the air control valve 19 extends through the first intake passage 12, the second intake passage 13, and the third intake passage 14. The third intake passage 14 is connected to the combustion chamber 5 via the third intake valve 9. This third intake passage 14 is shaped in the form of a straight port extending in a straight line. A fuel injector 21 is arranged on the upper wall of the third intake passage 14, and fuel is injected from the fuel injector 21 towards the rear face of the valve head of the third intake valve 9.

Figure 5:
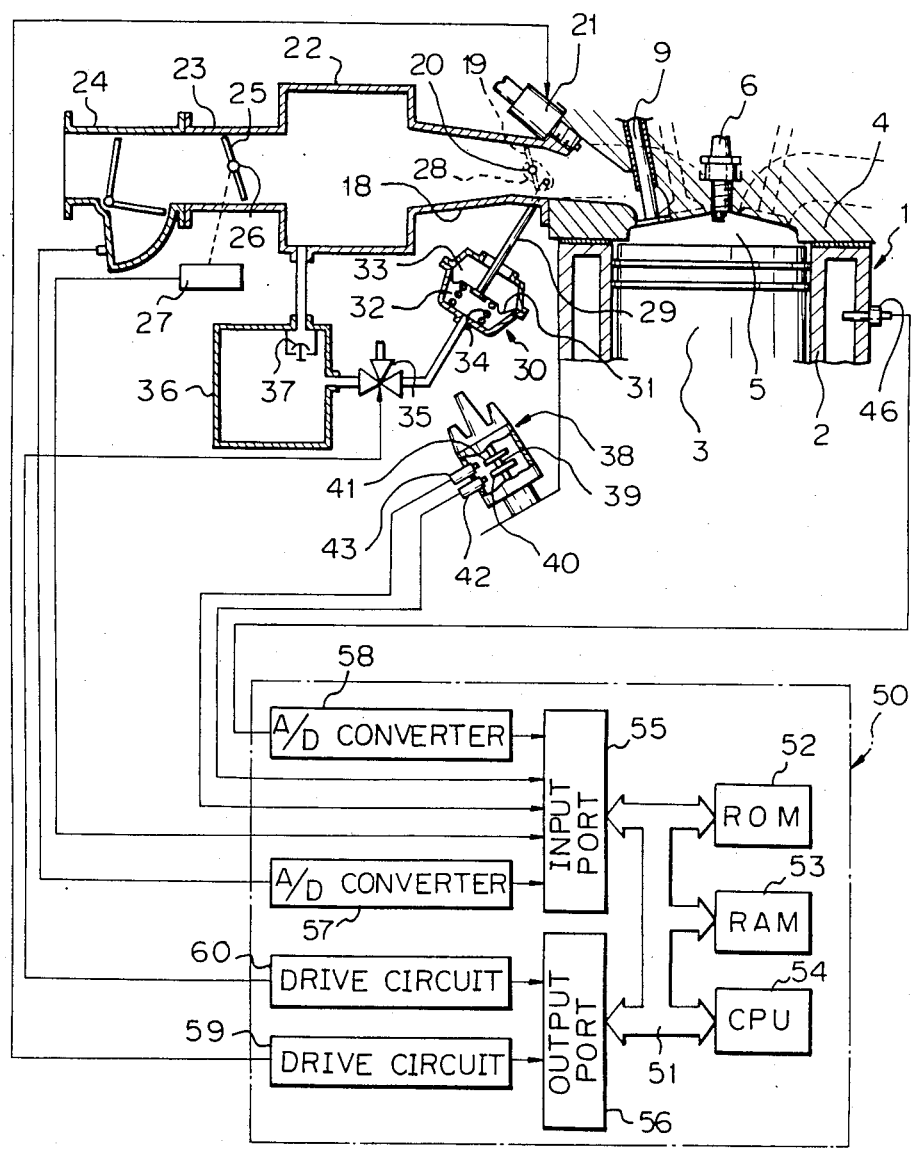
FIG. 5 is a view illustrating the entirety of the engine and an electronic control unit.

Referring to FIG. 5, the manifold branch 18 is connected to a common surge tank 22, and this surge tank 22 is connected to the air cleaner (not shown) via an intake duct 23 and an air flow meter 24. A throttle valve 25 connected to the accelerator pedal (not shown) is arranged in the intake duct 23, and a throttle switch 27 is connected to the valve shaft 26 of the throttle valve 25. The throttle switch 27 is made ON when the throttle valve 25 is approximately fully open. That is, if the degree of opening of the throttle valve 25 is, for example, 90 degrees, when the throttle valve 25 is fully open, the throttle switch 27 is made ON when the degree of opening of the throttle valve 25 exceeds 80 degrees. An arm 28 is fixed to the valve shaft 20 of the air control valve 19, and the tip of the arm 28 is connected to the diaphragm 31 of a vacuum operated actuator 30 via a control rod 29. The actuator 30 comprises a vacuum chamber 32 and an atmospheric pressure chamber 33 which are separated by the diaphragm 31. A compression spring 34 for biasing the diaphragm 31 is arranged in the vacuum chamber 32. The vacuum chamber 32 is connected to a vacuum tank 36 via a solenoid valve 35 which can be opened to the outside air. The vacuum tank 36 is connected to the surge tank 22 via a check valve 37 which allows only the outflow of air from the surge tank 36, and thus the level of vacuum in the vacuum tank 36 is maintained at the maximum level of vacuum produced in the surge tank 22. A distributor 38 is mounted on the engine body 1 and has a rotor 39 driven by the engine at a speed of one half of the rotating speed of the crank shaft (not shown). A pair of discs 40 and 41 are fixed to the rotor 39, and a pair of crank angle sensors 42 and 43 are arranged to face the toothed outer peripheral faces of the discs 40 and 41, respectively. The crank angle sensor 42 is a sensor detecting that, for example, the piston of the No. 1 cylinder is positioned at top dead center, and thus this crank angle sensor 42 produces an output pulse when the piston of the No. 1 cylinder is positioned at the top dead center. The crank angle sensor 43 produces an output pulse every time the crank shaft rotates by, for example, 30 degrees. Consequently, the crank angle of each cylinder can be calculated from the output pulses of the crank angle sensors 42 and 43, and the engine speed can be calculated from the output signals of the crank angle sensor 43. The crank angle sensors 42, 43 are connected to an electronic control unit 50.

Referring again to FIG. 2, the third intake passage 14 upstream of the fuel injector 21 is connected to the exhaust passage 15 via an exhaust gas recirculation conduit 44, and an exhaust gas control valve 45 is arranged in the exhaust gas recirculation conduit 44 in order to control the amount of exhaust gas recirculated into the third intake passage 14 from the exhaust passage 15.

As illustrated in FIG. 5, the electronic control unit 50 is constructed as a digital computer and comprises a ROM (read-only memory) 52, a RAM (random access memory) 53, a CPU (microprocessor, etc.) 54, an input port 55 and an output port 56. The ROM 52, the RAM 53, the CPU 54, the input port 55 and the output port 56 are interconnected to each other via a bidirectional bus 51. The air flow meter 24 produces an output voltage which is proportional to the amount of air fed into the engine cylinders. This air flow meter 24 is connected to the input port 55 via an AD converter 57. In addition, a cooling water temperature sensor 46 is attached to the engine body 1 and produces an output voltage which is proportional to the cooling water temperature. This cooling water temperature sensor 46 is connected to the input port 55 via an AD converter 58. Furthermore, the throttle switch 27 and the crank angle sensors 42, 43 are connected to the input port 55. The output port 56 is connected to the fuel injector 21 and the solenoid valve 35 via corresponding drive circuits 59, 60.

FIG. 5 illustrates a valve drive device which is capable of driving all of the intake valves 7, 8, 9 at the same time by a single camshaft. Referring to FIG. 5, one end of a rocker arm 61 is supported on the cylinder head 4 via a pivot 62, and the other end of the rocker arm 61 is seated on the upper end of the second intake valve 8. The middle portion of the rocker arm 61 is in contact with the cam face of a camshaft 63 driven by the engine. Consequently, the second intake valve 8 is driven by the camshaft 63 via the rocker arm 61. The first intake valve 7 is also driven by the camshaft 63 via the rocker arm having a shape which is the same as that of the rocker arm 61. Contrary to this, in the third intake valve 9, a valve lifter 64 is fitted to the top portion of the third intake valve 9. The valve lifter 64 is in contact with the cam face of the camshaft 62, and thus the third intake valve 9 is driven by the camshaft 63 via the valve lifter 64.

Figure 6:
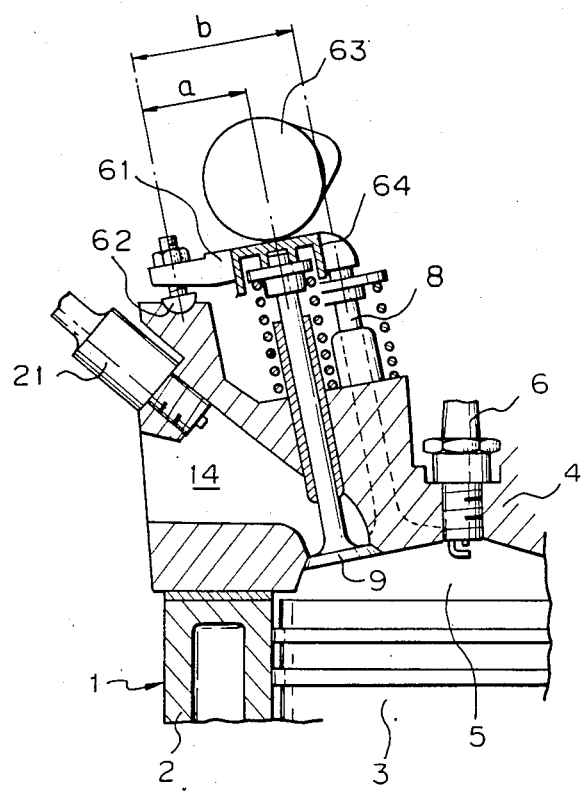
FIG. 6 is a cross-sectional view of a portion of the cylinder head.

In FIG. 6, a indicates the distance between the pivot 62 and the third intake valve 9, and b indicates the distance between the pivot 62 and the second intake valve 8. As will be understood from FIG. 6, if the cam profile of the camshaft 63 for the third intake valve 9 is the same as that of the camshaft 63 for the second intake valve 8, the valve lift of the second intake valve 8 becomes b/a times the valve lift of the third intake valve 9. That is, by adopting the valve drive device illustrated in FIG. 6, it is possible to easily change the valve lifts for the third intake valve 9 and the second intake valve 8.

In an engine according to the present invention, when the engine is operating under a partial load, the air-fuel mixture in the combustion chamber 5 is stratified, and at this time, the air-fuel ratio of the air-fuel mixture is controlled so that the mean value of the air-fuel ratio becomes 25:1 through 30:1. Contrary to this, when the engine is operating under a heavy load, in order to obtain a high output power from the engine, the homogeneous air-fuel mixture is formed in the combustion chamber, and at the same time, the air-fuel ratio of the air-fuel mixture is reduced.

In order to enhance the degree of stratification when the engine is operating under a partial load, it is necessary to suitably determine the opening time of the third intake valve 9 and the stop time of the injecting operation of the fuel injection 21. That is, in the present invention, these opening and stop times are very important. These opening and stop times will be described after the description of the basic operation of the engine.

Figure 7:
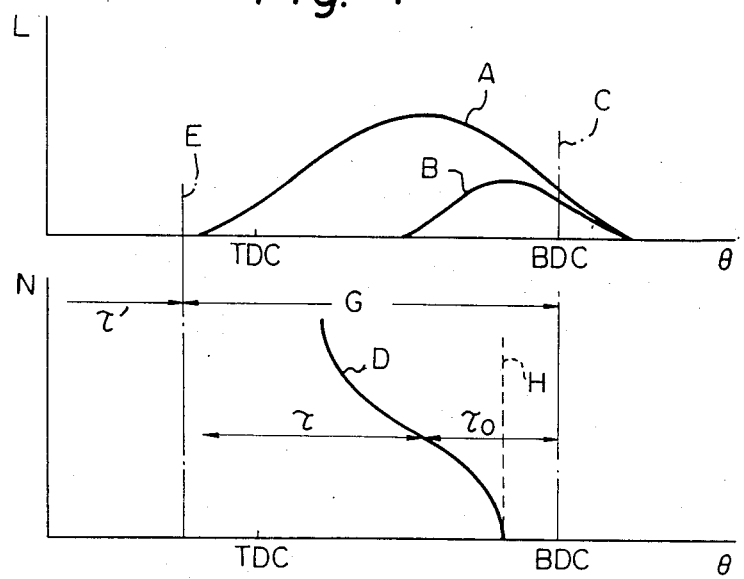
FIG. 7 is a diagram illustrating the opening time of the intake valves and the fuel injection time.

FIG. 7 illustrates the opening time of the first intake valve 7, the second intake valve 8 and the third intake valve 9. In FIG. 7, the ordinate L indicates a valve lift, and the abscissa θ indicates a crank angle. The opening time of the first intake valve 7 and the opening time of the second intake valve 8 are almost the same and, therefore, the opening time of the first intake valve 7 and the opening time of the second intake valve 8 are indicated by the single curved line A in FIG. 7. As can be seen from FIG. 7, the first intake valve 7 and the second intake valve 8 open slightly before the top dead center (TDC) of the intake stroke, and are closed at a crank angle slightly exceeding the bottom dead center (BTC), that is, at the beginning of the compression stroke.

The opening time of the third intake valve 9 is illustrated by the curved line B in FIG. 7. As can be seen from FIG. 7, the third intake valve 9 opens approximately at the center of the intake stroke and is closed at the same time as the first intake valve 7 and the second intake valve 8 are closed. It is necessary to open the third intake valve 9 approximately at the center of the intake stroke, but the closing time of the third intake valve 9 is relatively free. For example, it is possible to close the third intake valve 9 slightly before the first intake valve 7 and the second intake valve 8 are closed, and it is also possible to close the third intake valve 9 slightly after the first intake valve 7 and the second intake valve 8 are closed.

As will be hereinafter described in detail, the injecting operation of the fuel injector 21 is stopped, for example, slightly before the third intake valve 9 is closed, so that the entire fuel injected from the fuel injector 21 can be fed into the combustion chamber 5.

The air control valve 19 is completely closed when the engine is operating under a partial load, and the air control valve 19 is fully open when the engine is operating under a heavy load.

As mentioned above, when the engine is operating under a partial load, the air control valve 19 is completely closed. Consequently, when the first intake valve 7 and the second intake valve 8 open, and thus the intake stroke is started and air is fed into the combustion chamber 5 from only the first intake passage 12, but is not fed into the combustion chamber from the second intake passage 13. As mentioned above, since the first intake passage 12 is shaped in the form of a helical port, the air flows, while swirling, into the combustion chamber 5 from the first intake passage 12, and thus a strong swirl motion is created in the combustion chamber 5, particularly in the cavity 3a. When the piston 3 moves downward by about half a stroke, the third intake valve 9 opens. Consequently, at this time, the air-fuel mixture formed in the third intake passage 14 by fuel injected from the fuel injector 21 flows into the combustion chamber 5 via the third intake valve 9. As mentioned previously, since the peripheral edge of the third intake valve 9 is surrounded by the vertical side face 4c of the raised wall 4b, a large part of the air-fuel mixture from the third intake passage 14 flows toward a space around the spark plug 6 arranged at the center of the top face of the combustion chamber 5, and a small amount of the air-fuel mixture flows downward via the clearance formed between the third intake valve 9 and the vertical side face 4c. Since the valve lift of the third intake valve 9 is small at the beginning of the opening operation of the third intake valve 9, the amount of the air-fuel mixture fed into the combustion chamber 5 is small. At this time, the air-fuel mixture is mixed with the air swirling in the combustion chamber 5 and forms a lean air-fuel mixture in an area near the top wall of the combustion chamber 5. In addition, at this time, almost only air exists in the cavity 3a.

When the piston 3 moves further downward, the valve lift of the third intake valve 9 is increased, and the amount of the air-fuel mixture flowing into the combustion chamber 5 from the third intake passage 14 is accordingly increased. At this time, the air-fuel mixture from the third intake passage 14 also flows towards a space around the spark plug 6 due to the presence of the vertical side face 4c.

At the beginning of the latter half of the intake stroke, since the valve lift of the first intake valve 7 becomes gradually small, the amount of air flowing into the combustion chamber 5 from the first intake valve 12 becomes small accordingly. Contrary to this, at this time, since the valve lift of the third intake valve 9 becomes large, the amount of the air-fuel mixture flowing into the combustion chamber 5 from the third intake passage 14 is increased. This air-fuel mixture is also introduced into a space around the spark plug 6 due to the presence of the vertical side face 4c, and thus the air-fuel mixture formed at the top of the combustion chamber 5 becomes gradually rich. The nearer the first intake valve 7 approaches the closing time, the richer becomes the air-fuel mixture formed at the top of the combustion chamber 5. Therefore, when the first intake valve 7 and the third intake valve 9 are closed, a rich air-fuel mixture is formed at the top of the combustion chamber 5. In addition, the air-fuel mixture in the combustion chamber 5 becomes lean towards the top face of this piston 3, and almost only air exists on the top face of the piston 3 and in the cavity 3a.

When the compression stroke is started, the air on the top face of the piston 3 is mixed with the ambient lean air-fuel mixture and becomes a lean air-fuel mixture. At the end of the compression stroke, a small amount of the air-fuel mixture which has passed the clearance between the third intake valve 9 and the vertical side face 4c is compressed in the squish area S and spouted from the squish area S towards the spark plug 6 in the form of a squish flow. The rich air-fuel mixture remaining around the third intake valve 9 is collected around the spark plug 6 due to this squish flow. Thus, at the end of the compression, a rich air-fuel mixture is collected at the top of the combustion chamber 5, and a lean air-fuel mixture exists near the top face of the piston 3. Consequently, the air-fuel mixture in the combustion chamber 5 is stratified. Since the rich air-fuel mixture is collected at the top of the combustion chamber 5, the rich air-fuel mixture exists around the spark plug 6, and thus the air-fuel mixture in the combustion chamber 5 can be easily ignited by the spark plug 6. At this time, since a swirl motion is created in the combustion chamber 5, the flame of the air-fuel mixture spreads rapidly within the combustion chamber 5.

In addition, in the present invention, as can be seen from FIG. 2, the exhaust gas is recirculated into the third intake passage 14. When the third intake valve 9 is open, the recirculated exhaust gas is introduced to a space around the spark plug 6 together with the air-fuel mixture, due to the presence of the vertical side face 4c. That is, the recirculated exhaust gas is mixed with only the rich air-fuel mixture collected at the top of the combustion chamber 5. As is well known, NOx is generated when the rich air-fuel mixture is burnt. Therefore, in the present invention, the recirculated exhaust gas is effectively used for suppressing the generation of NOx.

As mentioned previously, in order to obtain a good combustion where the air-fuel mixture in the combustion chamber 5 is stratified, it is necessary to enhance the degree of stratification. To this end, it is necessary to suitably determine the opening time of the third intake valve 9 and the stop time of the injecting operation of the fuel injector 21. That is, if the opening time of the third intake valve 9 is too far advanced, since the feeding operation of the air-fuel mixture into the combustion chamber 5 is started from the beginning of the intake stroke, the degree of stratification decreases. Contrary to this, if the opening time of the third intake valve 9 is too retarded, the entire fuel injected from the fuel injector 21 cannot flow into the combustion chamber 5 during the time that the third intake valve 9 is open. The fuel which cannot flow into the combustion chamber 5 remains in the third intake passage 14, and all the remaining fuel flows into the combustion chamber 5 when the third intake valve 9 opens. However, if all the remaining fuel flows into the combustion chamber 5 when the third intake valve 9 opens, a rich air-fuel mixture is formed in the combustion chamber 5 at the middle of the intake stroke, and thus it is impossible to enhance the degree of stratification.

Figure 8:
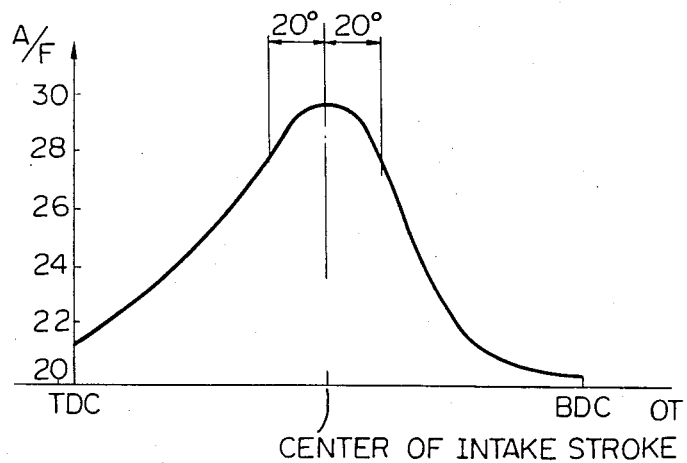
FIG. 8 is a diagram illustrating a change in the mean value of the air-fuel ratio.

FIG. 8 illustrates the combustible limit of the air-fuel mixture. In FIG. 8, the ordinate A/F indicates the mean value of the air-fuel ratio of the air-fuel mixture fed into the engine cylinders, and the abscissa OT indicates the opening time of the third intake valve 9. As can be seen from FIG. 8, the mean value of the air-fuel ratio of the air-fuel mixture becomes maximum when the third intake valve 9 opens approximately at the center of the intake stroke. The combustible limit of the air-fuel mixture represents the degree of stratification and, therefore, the degree of stratification becomes maximum when the third intake valve 9 opens approximately at the center of the intake stroke. In addition, as can be seen from FIG. 8, a high degree of stratification can be obtained when the third intake valve 9 opens at a crank angle within 20 degrees from the center of the intake stroke. Consequently, it is not always necessary to determine the opening time of the third intake valve 9 so that it opens exactly at the center of the intake stroke, and thus, in the present invention, the third intake valve 9 opens approximately at the center of the intake stroke.

As mentioned above, if the fuel injected from the fuel injector 21 remains in the third intake passage 13, it is impossible to sufficiently stratify the air-fuel mixture in the combustion chamber 5 and, in addition, the responsiveness of an increase in the output power of the engine to the accelerating operation will deteriorate. Consequently, it is necessary to feed the entire fuel injected by the fuel injector 21 into the combustion chamber 5 during the intake stroke. That is, if the injecting operation is carried out too early in the intake stroke, since the third intake valve 9 is closed when the injecting operation is carried out, the fuel injected from the fuel injector 21 is stored in the third intake passage 14. Then, the fuel thus stored flows into the combustion chamber 5 when the third intake valve 9 opens. As a result, the degree of stratification becomes low. Consequently, it is necessary to retard the injection time as much as possible.

According to the experiments conducted by the present inventors, it has been proven that, if the fuel injected from the fuel injector 21 reaches the inner wall of the third intake passage 14 or the rear face of the valve head of the third intake valve 9 before the piston 3 reaches the bottom dead center (BDC) illustrated by the line C in FIG. 7, it is possible to feed the entire fuel injected by the fuel injector 21 into the combustion chamber 5. Fuel is injected from the fuel injector 21, and then after a given time elapses, the fuel reaches, for example, the rear face of the valve head of the third intake valve 9. This elapsed time is approximately constant, but the crank angle corresponding to this elapsed time is changed in accordance with a change in the engine speed. That is, the crank angle between a crank angle at which the fuel leaves the fuel injector 21 and a crank angle at which the fuel reaches the third intake valve 9 becomes large as the engine speed increases. Consequently, to ensure that the last injected fuel part reaches the rear face of the valve head of the third intake valve 9 at a crank angle near the bottom dead center (BDC), it is necessary to advance the stop time of the fuel injecting operation as the engine speed increases. In addition, the above-mentioned lapsed time also depends on the velocity of air flowing within the third intake passage 14. That is, the velocity of air flowing within the third intake passage 14 becomes high as the engine speed increases. Consequently, considering only the velocity of the air, it is necessary to retard the stop time of the fuel injecting operation as the engine speed increases.

The optimum stop time of the fuel injecting operation, which takes the velocity of the air into consideration, is indicated by the curved line D in FIG. 7. In FIG. 7, the ordinate N indicates a engine speed, and the abscissa $\theta$ indicates a crank angle. As can be seen from the curved line D in FIG. 7, the stop time of the fuel injecting operation, which is represented by a crank angle $\theta$, is advanced as the engine speed N increases. However, as mentioned above, the velocity of air flowing within the third intake passage 14 becomes high as the engine speed N increases. Consequently, the degree of change in the stop time of the fuel injecting operation relative to an increase in the engine speed N becomes small as the engine speed N increases when the engine is operating at a relatively high speed. If the injecting operation of the fuel injector 21 is stopped at a crank angle illustrated by the curved line D in FIG. 7, the finally injected fuel amount reaches the rear face of the valve head of the third intake valve 9 at a crank angle near the bottom dead center C of the intake stroke, independently of the engine speed. As a result, the entire fuel injected from the fuel injector 21 is fed into combustion chamber 5 during the time the third intake valve 9 is open. In addition, a large amount of the air-fuel mixture is fed into the combustion chamber 5 at the end of the intake stroke. Thus, it is possible to enhance the degree of stratification. In FIG. 7, $\tau_0$ indicates a control time from the stop time of the fuel injecting operation to the bottom dead center, and $\tau$ indicates a fuel injection time.

When the engine is operating under a heavy load, the air control valve 19 is fully open, and the amount of fuel injected from the fuel injector 21 is increased by a predetermined rate. When the air control valve 19 is open, air is fed into the combustion chamber 5 from both the first intake passage 12 and the second intake passage 13, and thus the volumetric efficiency is increased. At this time, the injecting operation of the fuel injector 21 is stopped at a crank angle illustrated by the line E in FIG. 7, that is, slightly before the first intake valve 7 and the second intake valve 8 are opened. In FIG. 7, $\tau'$ indicates a fuel injection time for this case. If the injection time of fuel is advanced as illustrated by $\tau'$, the fuel injected from the fuel injector 21 is stored in the third intake passage 9, and this fuel is fed into the combustion chamber 5 as soon as the third intake valve 9 opens. As a result, as mentioned previously, the degree of stratification becomes low. In addition, since the fuel stored in the third intake passage 14 is sucked into the first intake passage 12 and the second intake passage 13 by the airstreams flowing within the first intake passage 12 and the second intake passage 13, the air-fuel mixture is also fed into the combustion chamber 5 from the first intake passage 12 and the second intake passage 13. Consequently, when the engine is operating under a heavy load, the degree of stratification becomes excessively low, and a considerably uniform air-fuel mixture is formed in the combustion chamber 5. As a result, even if the amount of fuel injected from the fuel injector 21 is increased by a predetermined rate, there is no danger that an excessive rich air-fuel mixture will be formed around the spark plug 6. Therefore, good ignition can be obtained and, since the amount of fuel injected from the fuel injector 21 is increased by a predetermined rate, a high engine output power can be obtained.

In order to enhance the degree of stratification, it is best to change the stop time of the fuel injecting operation along the curved line D in FIG. 7. However, this change in the stop time requires a complicated control of the injecting operation.

Consequently, in an alternative embodiment, it is possible to maintain the stop time of the fuel injecting operation at a fixed crank angle, illustrated by the broken line H in FIG. 7, when the engine is operating under a load. That is, in this embodiment, when the engine is operating under a partial load, the injecting operation of the fuel injector 21 is stopped slightly before the third intake valve 9 is closed, independently of the engine speed.

In this embodiment, it is true that the degree of stratification becomes slightly low when compared with that in the first embodiment illustrated by the curved line D in FIG. 7. However, the curved line D is changed according to the type of engine, and it takes much time and labour to determine the curved line D. Nevertheless, in the alternative embodiment, since the stop time of the fuel injecting operation is maintained as a constant, it can be easily determined. Adoption of the first embodiment or the alternative embodiment is made in accordance with the necessity thereof.

The control of the fuel injector 21 and the air control valve 19 will be hereinafter described in reference to flow charts illustrated in FIGS. 9 and 10.

Figure 9:
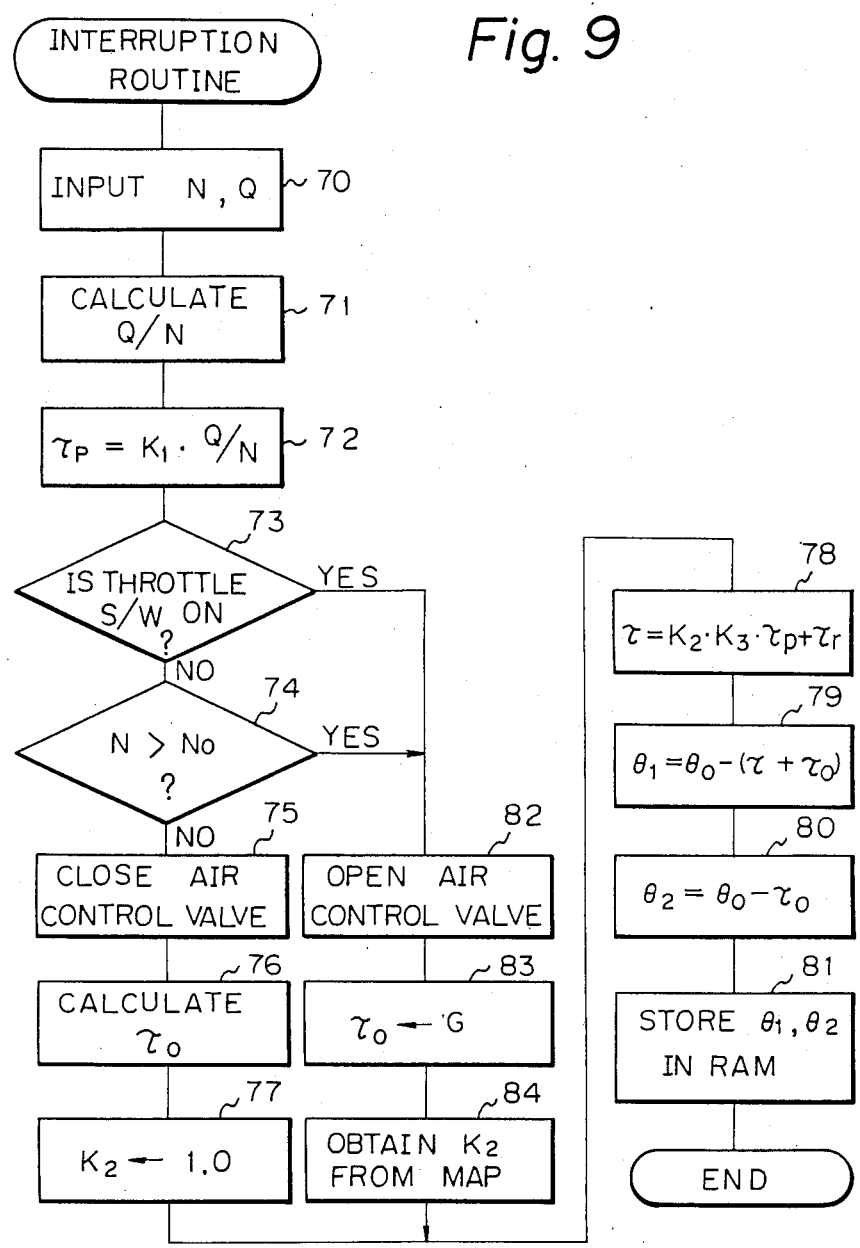
FIG. 9 is a flow chart for calculating the injection time.
Figure 11:
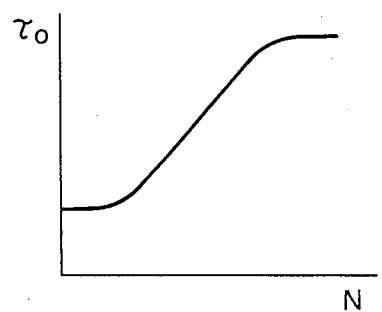
FIG. 11 is a diagram illustrating a relationship between the control time and the engine spread.

Referring to FIG. 9, in step 70, the output signal of the crank angle sensor 43, which represents the engine speed N, and the output signal of the air flow meter 24, which represents the amount of air Q fed into the engine cylinders, are input into the CPU 54. Then, in step 71, Q/N is calculated. Q/N represents the amount of air fed into each cylinder per one cycle and, therefore, Q/N corresponds to the engine load. Then, in step 72, a basic fuel injection pulse width $\tau_p$ is calculated from the equation $\tau_p = K_1 \cdot Q/N$; where $K_1$ is constant. Then, in step 73, it is determined whether the throttle switch 27 is ON, that is, the throttle valve 25 is approximately fully open. When the throttle valve 25 is not approximately fully open, the routine goes to step 74, and it is determined whether the engine speed N is higher than a predetermined speed $N_O$, for example, 3000 r.p.m. If $N \leq N_0$, the routine goes to step 75, and data indicating that the solenoid valve 35 should be deenergized is written in the output port 56. At this time, the vacuum chamber 32 of the actuator 30 is connected to the vacuum tank 36 via the solenoid valve 35. As a result, the diaphragm 31 moves towards the vacuum chamber 32, causing the air control valve 19 to completely close. Then, in step 76, the control time $\tau_0$ from the stop time of the fuel injecting operation to the bottom dead center is calculated. As mentioned previously, in the first embodiment, the stop time of the fuel injecting operation is changed along the curved line D in FIG. 7. Consequently, as can be seen from FIG. 11, the control time $\tau_0$ is changed in accordance with a change in the engine speed N. The relationship between the control time $\tau_0$ and the engine speed N is stored in the ROM 52 in the form of an equation or a data table. Consequently, in the first embodiment, in step 36, the control time $\tau_0$ is calculated from the data stored in the ROM 52. In the alternative embodiment, as mentioned previously, the control time $\tau_0$ is maintained as a constant independently of the engine speed N. Consequently, in the alternative embodiment, in step 76, a fixed time is input as the control time $\tau_0$.

In step 77, 1.0 is input to an enrichment coefficient $K_2$ and the routine then goes to step 78. In step 78, an actual fuel injection pulse width $\tau$ is calculated from the equation $\tau = K_2 \cdot K_3 \cdot \tau_p + \tau_r$; where, $K_3$ indicates a correction coefficient, and $\tau_r$ indicates an invalid injection time. Then, in step 79, the start time $\theta_1$ of the injecting operation of the fuel injector 21 is calculated from the equation $\theta_1 = \theta_0 - (\tau + \tau_0)$; where $\theta_0$ indicates the crank angle of the bottom dead center of the intake stroke. In the above-mentioned equation, $\tau$ indicates the crank angle during which the injecting operation of fuel is carried out, and $\tau_0$ indicates the crank angle corresponding to the control time. Consequently, in step 79, the injection starting crank angle $\theta_1$ relative to the reference crank angle $\theta_0$ is calculated. Then, in step 80, the injection stop crank angle $\theta_2$ relative to the reference crank angle $\theta_0$ is calculated from the equation $\theta_2 = \theta_0 - \tau_0$. Then, in step 81, the injection start crank angle $\theta_1$ and the injection stop crank angle $\theta_2$ thus calculated is stored in the RAM 53.

When it is determined in step 73 that the throttle switch 27 is ON, or when it is determined in step 74 that the engine speed N is higher than $N_0$, the routine goes to step 82, and data indicating that the solenoid valve 35 should be energized is written in the output port 56. At this time, since the vacuum chamber 32 of the actuator 30 is open to the outside air via the solenoid valve 35, the diaphragm 31 moves towards the atmospheric pressure chamber 33, causing the air control valve 19 to fully open. Then, in step 83, a fixed crank angle G is put into the control time $\tau_0$. As illustrated in FIG. 7, this fixed crank angle G is a crank angle between the bottom dead center C and a crank angle occupying a position slightly before the first intake valve 7 and the second intake valve 8 are opened.

Figure 12:
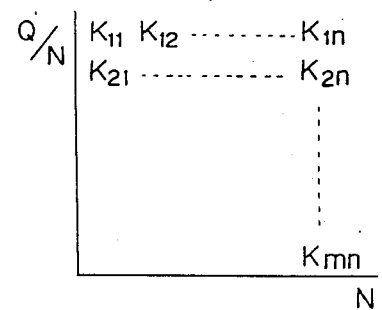
FIG. 12 is a diagram illustrating an enrichment coefficient stored in the ROM.

Then, in step 84, the enrichment coefficient $K_2$ is obtained. As illustrated in FIG. 12, the enrichment coefficient $K_2$ is determined by Q/N and N, and the enrichment coefficients $K_{11}, \ldots K_{mn}$ illustrated in FIG. 8 are stored in the ROM 52 in the form of a map. The enrichment coefficient $K_2$ is larger than 1.0 and becomes as large as Q/N and N. Then, in step 78, the fuel injection pulse width $\tau$ is calculated. At this time, since the enrichment coefficient $K_2$ is larger than 1.0 as mentioned above, the fuel injected from the fuel injector 21 is increased. In step 80, the injection stop crank angle $\theta_2$ is calculated. At this time, since $\tau_0$ is the fixed crank angle G, the stop time of the fuel injecting operation is fixed at a crank angle occupying a position slightly before the first intake valve 7 and the second intake valve 8 are opened.

Figure 10:
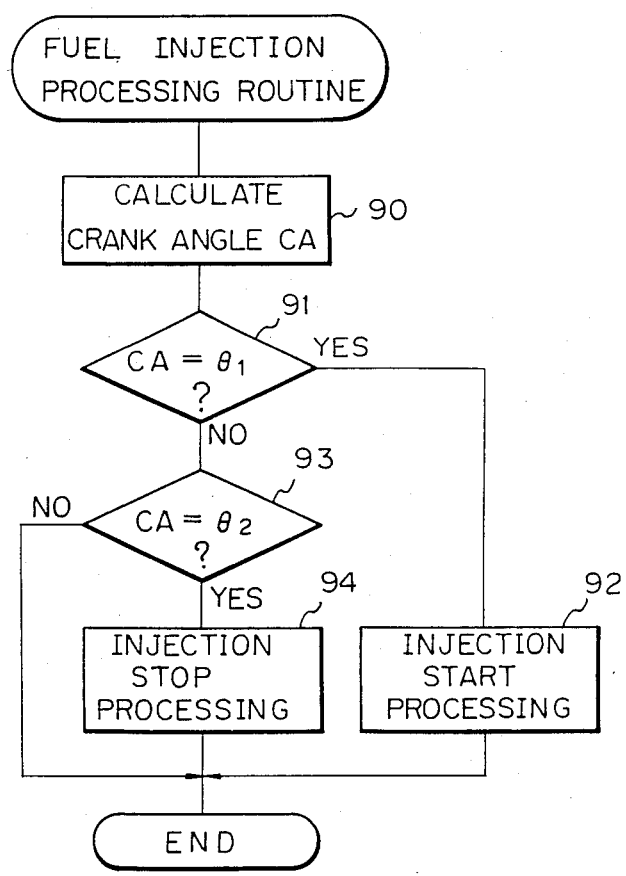
FIG. 10 is a flow chart of a fuel injection processing routine.

FIG. 10 illustrates a fuel injection processing routine. This routine is processed by sequential interruptions which are executed every predetermined time. Referring to FIG. 10, in step 90, the present crank angle CA is calculated from the output signals of the crank angle sensors 42, 43. Then, in step 91, it is determined whether the present crank angle CA is equal to the injection start crank angle $\theta_1$ stored in the RAM 53. If $CA=C_1$, the routine goes to step 92. In step 92, data indicating that the injecting operation of fuel should be started is written in the output port 56 and then the injection of fuel from the fuel injector 21 is started. When it is determined in step 91 that the present crank angle CA is not equal to the injection start crank angle $\theta_1$, the routine goes to step 93, and it is determined whether the present crank angle CA is equal to the injection stop crank angle $\theta_2$. If $CA=\theta_2$, the routine goes to step 94. In step 94, data indicating that the fuel injecting operation should be stopped is written in the output port 56, and thus the injecting operation of the fuel injector 21 is stopped.

As can be seen from the flow chart illustrated in FIG. 9, when the degree of opening of the throttle valve 25 is smaller than the predetermined degree, and when the engine speed N is lower than the predetermined speed $N_0$, the air intake valve 19 is closed, and the fuel injecting operation is stopped at a crank angle illustrated by the curved line D in FIG. 4. As a result, the degree of stratification is enhanced, and thus a good combustion can be obtained. In addition, when the third intake valve 9 opens, air flows within the third intake passage 14. Therefore, vaporization of the fuel in the third intake passage 14 is promoted, and thus a good ignition can be obtained.

Contrary to this, when the throttle valve 25 is approximately fully open, or when the engine speed N is higher than $N_0$, the air control valve 19 is open, and the fuel injecting operation is stopped at the fixed crank angle illustrated by E in FIG. 7. As a result, the degree of stratification becomes low, as mentioned previously, and an approximately uniform air-fuel mixture is formed in the combustion chamber 5. In addition, at this time, the amount of fuel injected from the fuel injector 21 is increased, and thus the mean value of the air-fuel ratio becomes low. However, since the degree of stratification becomes low, as mentioned above, there is no danger that the air-fuel mixture around the spark plug 6 will become excessively rich. Thus, a good ignition can be obtained. Furthermore, since the mean value of the air-fuel ratio becomes low, a high engine output power can be obtained.

Figure 14:
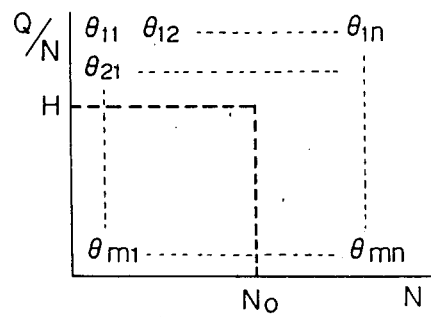
FIG. 14 is a diagram illustrating an injection start crank angle stored in the ROM.
Figure 13:
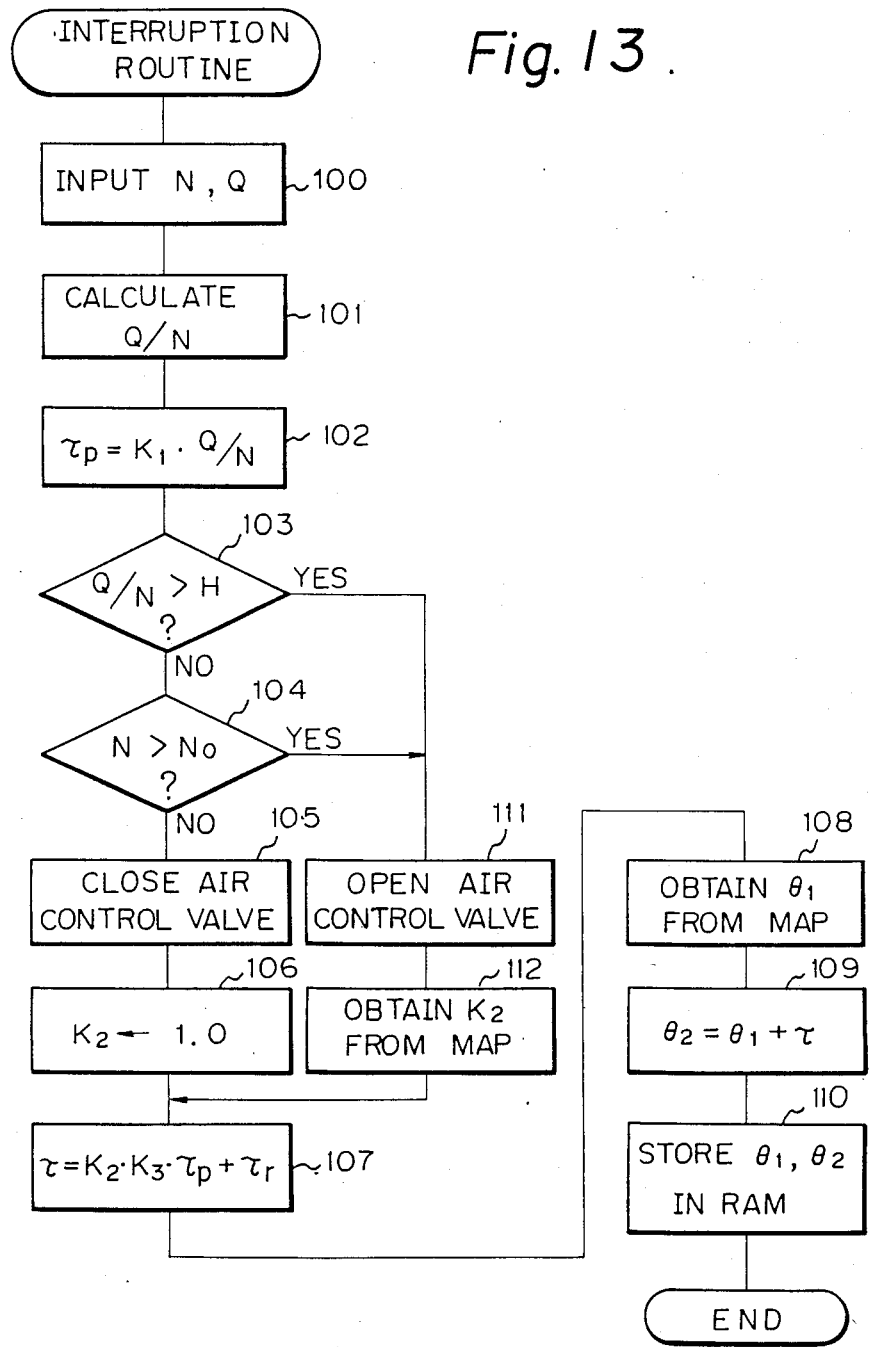
FIG. 13 is an alternative flow chart from calculating the injection time.

FIG. 13 illustrates an alternative embodiment of a flow chart used for obtaining the injection start crank angle $\theta_1$ and the injection stop crank angle $\theta_2$. The steps 100 through 102 illustrated in FIG. 13 are the same as the steps 70 through 72 illustrated in FIG. 9 and, therefore, the description regarding these steps 100 through 102 is omitted. Referring to FIG. 13, in step 103, it is determined whether Q/N is larger than a fixed value H, that is, whether the engine is operating under a heavy load. When the engine is not operating under a heavy load, the routine goes to step 104, and it is determined whether the engine speed N is higher than a predetermined speed $N_0$. If $N \leq N_0$, the air control valve 19 is closed in step 105 and then, in step 106, 1.0 is input to the enrichment coefficient $K_2$. Then, in step 107, the fuel injection pulse width $\tau$ is calculated, and then, in step 108, the injection start crank angle $\theta_1$ is obtained from a map. That is, the relationship among the injection start crank angle $\theta$, Q/N, and N is stored in the ROM 52 in the form of a map, as illustrated in FIG. 14. In step 108, the injection start crank angle $\theta_1$ is calculated from data $\theta_{11}, \theta_{12} \ldots \theta_{mn}$ stored in the ROM 52. Then, in step 109, the injection stop crank angle $\theta_2$ is calculated from the equation $\theta_2 = \theta_1 + \tau$, and then, in step 110, $\theta_1$ and $\theta_2$ are stored in the ROM 53.

If Q/N > H, or if $N > N_0$, the routine goes to step 111. In step 111, the air control valve 19 is caused to be fully open and then, in step 112, the enrichment coefficient $K_2$ is obtained from the map stored in the ROM 52, as illustrated in FIG. 12. The major different between this embodiment and the embodiment illustrated in FIG. 9 resides in that, in the embodiment illustrated in FIG. 9, the injection start crank angle $\theta_1$ is obtained by calculation, while, in the embodiment illustrated in FIG. 13, the injection start crank angle $\theta_1$ is stored in the ROM 52 in the form of the map.

As mentioned above, according to the present invention, since it is possible to enhance the degree of stratification, even if an excessively lean air-fuel mixture having the mean value of the air-fuel ratio 25:1 through 30:1 is used, good combustion can be obtained.

While the invention has been described with reference to specific embodiments chosen for purposes of illustration, it should be apparent that numerous modifications could be made thereto by those skilled in the art without departing from the basic concept and scope of the invention.

We claim:

1. An internal combustion engine having a combustion chamber, comprising:
    a first intake valve opening at a crank angle near to top dead center of an intake stroke and closing at a beginning of a compression stroke;
    a second intake valve opening at a crank angle near to the top dead center of the intake stroke and closing at the beginning of the compression stroke;
    a third intake valve opening approximately at the center of the intake stroke and closing at the beginning of the compression stroke;
    a first intake passage connected to said combustion chamber via said first intake valve and creating a swirl motion in said combustion chamber;

a second intake passage connected to said combustion chamber via said second intake valve;

a third intake passage connected to said combustion chamber via said third intake valve;

an air control valve arranged in said second intake passage;

means for actuating said air control valve in response to an engine load to open said air control valve when the engine load exceeds a predetermined load;

a fuel injector arranged in said third intake passage; and electronic control means controlling a fuel injecting operation of said fuel injector to stop the fuel injecting operation during the intake stroke.

2. An internal combustion engine according to claim 1, wherein said electronic control means controls the fuel injecting operation in response to the engine load to stop the fuel injecting operation during the intake stroke when the engine load is lower than said predetermined load.

3. An internal combustion engine according to claim 2, wherein said electronic control means stops the fuel injecting operation slightly before said first intake valve and said second intake valve are opened when the engine load exceeds said predetermined load.

4. An internal combustion engine according to claim 3, wherein said electronic control means stops the fuel injecting operation at a fixed crank angle when the engine load exceeds said predetermined load.

5. An internal combustion engine according to claim 2, wherein said electronic control means stops the fuel injecting operation slightly before said first intake valve and said second intake valve are closed when the engine load is lower than said predetermined load.

6. An internal combustion engine according to claim 5, wherein said electronic control means stops the fuel injecting operation at a fixed crank angle when the engine load is lower than said predetermined load.

7. An internal combustion engine according to claim 2, wherein said electronic control means controls the fuel injecting operation in response to an engine speed to advance the stop time of the injecting operation as the engine speed increases when the engine load is lower than said predetermined load.

8. An internal combustion engine according to claim 7, wherein the stop time of the fuel injecting operation is changed from the end of the intake stroke toward the beginning of the intake stroke when the engine load is lower than said predetermined load.

9. An internal combustion engine according to claim 8, wherein the degree of change in the stop time of the fuel injecting operation relative to an increase in the engine speed decreases when the engine speed is relatively high.

10. An internal combustion engine according to claim 1, wherein said electronic control means controls the fuel injecting operation in response to an engine speed to calculate the injection start crank angle on the basis of the engine load and the engine speed.

11. An internal combustion engine according to claim 10, wherein said electronic control means comprises a memory in which the relationship among the injection start crank angle, the engine load, and the engine speed is stored.

12. An internal combustion engine according to claim 10, wherein a basic fuel injection pulse width is calculated from the engine load and the engine speed and widened when the engine load exceeds said predetermined load and when the engine speed exceeds a predetermined speed.

13. An internal combustion engine according to claim 1, wherein said actuating means actuates said air control valve in response to an engine speed to open said air control valve when the engine load exceeds said predetermined load and when the engine speed exceeds a predetermined speed.

14. An internal combustion engine according to claim 1, wherein said combustion chamber has a top face in which said third intake valve is arranged, a raised wall being formed on said top face around a peripheral edge of said third intake valve, which is opposite to a center of said combustion chamber.

15. An internal combustion engine according to claim 14, wherein said raised wall has a vertical side face surrounding the peripheral edge of said third intake passage.

16. An internal combustion engine according to claim 1, further comprising a piston having a top face which has a cavity formed therein.

17. An internal combustion engine according to claim 1, further comprising a recirculated exhaust gas control device having a recirculated exhaust gas passage connected to said third intake passage.

18. An internal combustion engine according to claim 1, wherein said third intake passage is arranged between said first intake passage and said second intake passage.

19. An internal combustion engine according to claim 1, wherein said third intake passage has a cross-sectional area which is smaller than those of said first intake passage and said second intake passage.

20. An internal combustion engine according to claim 1, wherein said third intake passage is a helical port.

21. An internal combustion engine according to claim 1, wherein said third intake valve has a valve head having a diameter which is smaller than that of valve heads of said first intake valve and said second intake valve.

22. An internal combustion engine according to claim 1, wherein said third intake valve is arranged at a position opposite to a center of said combustion chamber with respect to a line passing through centers of the valve heads of said first intake valve and said second intake valve.

23. An internal combustion engine according to claim 1, further comprising an intake valve drive device having a single camshaft which actuates said first intake valve, said second intake valve, and said third intake valve at the same time.

24. An internal combustion engine according to claim 23, wherein said intake valve drive device has rocker arms, and said first intake valve and said second intake valve are actuated by said camshaft via said rocker arms, said third intake valve being directly actuated by said camshaft.

* * * * *